UNITED STATES PATENT OFFICE.

T. J. MAYALL, OF ROXBURY, MASSACHUSETTS.

IMPROVEMENT IN MANUFACTURE OF FLEXIBLE GAS-TUBES.

Specification forming part of Letters Patent No. 29,898, dated September 4, 1860.

*To all whom it may concern:*

Be it known that I, THOMAS J. MAYALL, of Roxbury, in the county of Norfolk and State of Massachusetts, have invented an improved compound for the manufacture of tubes and other articles which are used in contact with illuminating-gas, of which the following is a full, clear, and exact description.

Flexible pipes for conveying illuminating-gas have been made by covering a spirally-wound wire with a tube formed of braided thread, the whole being made tight by repeated coats of varnish. Leather has also been employed as the material of such pipes; but in either case the expense is considerable, and repeated efforts have been made to employ india-rubber in the manufacture of such tubes, but without success. Gas is found to penetrate through the body of the tube, while the naphtha which it deposits soon softens the india-rubber and destroys the tube. The attempt has been made to protect the interior of such tubes by means of oil-varnish; but this has proved to be of no avail, as the varnish cracks, and the gas and its deposits are soon admitted to the body of the tube and render it worthless. To remove these objections to the employment of india-rubber for this purpose is the object of my present invention, which I have perfected after over an hundred experiments and years of trial. These experiments indicate that india-rubber is in itself porous, and is rendered more porous still by the lead and by the large quantity of sulphur employed in the vulcanizing process; and my invention consists in a certain vulcanized compound of of india-rubber, gum-shellac, or of india-rubber, gum-shellac, and rosin, in which the lead is replaced by some metallic oxide or by a mixture of such oxide with clay and magnesia, and the quantity of sulphur is reduced to the smallest possible amount.

In the manufacture of this compound I also employ certain other ingredients—as calcined magnesia and olive-oil—which are not absolutely essential to the success of the operation, but which nevertheless facilitate the manipulation of the material.

To enable others skilled in the art to understand my invention, I will proceed to describe the manner in which I have carried it out most successfully and perfectly. I take one pound of india-rubber of the best quality, one-half pound white oxide of zinc, six ounces gum-shellac, two ounces calcined magnesia, one ounce rosin, two ounces finely-powdered and sifted clay, one-half ounce sulphur, one-half ounce olive-oil.

I do not limit myself to the above proportions, as they may be varied; but I have found the above to be the best proportions.

These ingredients are incorporated by grinding, and the pipe is formed of the compound, and subsequently vulcanized for the space of two hours at a temperature of 275° Fahrenheit. I prefer the use of steam, although dry heat may be used. The oxide of zinc serves to make the vulcanized article more elastic, while the magnesia causes the compound to work smoothly, and the oil causes it to mix more freely when grinding. These last-named materials are not employed on account of any influence which they may exert upon the permeability of the material, and their use does not form any part of my present invention. This consists in the use of shellac in the rubber, for the purposes set forth; but for the best results I dispense with the use of lead, and use as little sulphur as possible, and I also for convenience use the other substances described.

Thus far the above-described compound has been spoken of as particularly applicable to the manufacture of conduits for illuminating-gas; but it is obvious that it may be used for bags and other articles in a variety of cases where a flexible or elastic material is required to be exposed to contact with illuminating-gas for the purpose of conducting or retaining it.

I have described the various articles which I have used to produce the best result in the finished compound; but I do not consider them all indispensable, or claim the use of all, or the combination of all. The shellac is indispensable, and without it the rubber does not resist the action of the gas, but it can be compounded with rubber in other methods and proportions; but the above I have found to be the best.

I claim—

In the manufacture of flexible tubes and other articles which are used for the purpose of conducting or retaining illuminating-gas or other gaseous fluids, the use of a vulcanizable soft india-rubber compound containing gum-shellac as an essential ingredient.

THOS. J. MAYALL.

Witnesses:
P. S. TESCHEMACHER,
THOS. R. ROACH.